United States Patent [19]

Penton, Jr. et al.

[11] 4,102,867

[45] Jul. 25, 1978

[54] COPOLYESTERS OF PHTHALIC ACIDS AND HYDANTOINS

[75] Inventors: Harold Roy Penton, Jr.; Kenneth Boone Wagener, both of Asheville, N.C.

[73] Assignee: Akzona Incorporated, Asheville, N.C.

[21] Appl. No.: 742,161

[22] Filed: Nov. 15, 1976

[51] Int. Cl.$^2$ ............................................. C08G 63/68
[52] U.S. Cl. ................................................... 528/289
[58] Field of Search .......................... 260/75 N, 475 P

[56] References Cited

U.S. PATENT DOCUMENTS

| 3,856,754 | 12/1974 | Habermeier et al. | 260/75 N |
|---|---|---|---|
| 3,886,123 | 5/1975 | Habermeier et al. | 260/75 N |
| 3,937,753 | 2/1976 | Hahn et al. | 260/75 N X |
| 3,937,755 | 2/1976 | Hahn et al. | 260/75 N X |
| 4,014,824 | 3/1977 | Stockinger et al. | 260/75 N X |

*Primary Examiner*—Lucille M. Phynes
*Attorney, Agent, or Firm*—Francis W. Young; Jack H. Hall

[57] ABSTRACT

The disperse dyeability and moisture absorbency of a fiber and film forming poly(ethylene phthalate) ester is improved by including a hydantoin alcohol, hydantoin diacid, or a diester as a comonomer in the mixture of a phthalic acid or diester thereof and ethylene glycol to produce a random copolyester. The dyed fibers are useful for making various kinds of fabrics and articles made therefrom.

13 Claims, No Drawings

COPOLYESTERS OF PHTHALIC ACIDS AND HYDANTOINS

This invention relates generally to fiber and film forming polyester resins and more particularly to a method of improving the disperse dyeability and moisture absorbency of such resins and to the resulting product.

Fiber and film forming polyester resins such as those disclosed in U.S. Pat. Nos. 2,465,319; 2,437,232; 2,739,957; 2,895,946 and 3,018,272 are used commercially for making fabrics, carpets and the like. A polyester resin containing a predominant number of segments derived by esterification of terephthalic acid or a lower alkyl ester thereof and a dihydric alcohol is the most commonly used polyester resin for making fibers. Such fibers can be used to advantage for making carpets and fabrics for various purposes.

It has been proposed heretofore to dye the polyester fibers with disperse dyes but the rate of diffusion of the dye into the fibers is too slow for commercial production. Consequently, it has been suggested that the polyester resin be modified chemically by reaction with a comonomer. The comonomer may be a polyether, aliphatic diol, diester or dicarboxylic acid such as disclosed in J. Poly. Science, 14, 15 (1959). Other prior art methods for improving the dyeability of the polyester resin fiber are disclosed in U.S. Pat. Nos. 2,895,946; 3,018,272; 3,033,824; 3,184,434; 3,313,778; 3,528,947; 3,546,180; 3,700,644; 3,853,820; 3,856,753; 3,856,754 and 3,937,755. In accordance with the disclosure in the latter patent, U.S. Pat. No. 3,937,755, polyethylene block copolyesters having ethylene terephthalate blocks and hydantoin polymer blocks are prepared by a three step process wherein a poly(ethylene terephthalate) ester is prepared, a hydantoin polyester is prepared separately, and the two polyesters are then copolymerized to prepare a block copolyester. The disclosed polyesters have the disadvantages of requiring a three step process for their preparation and of having poor spinnability.

Another problem with poly(ethylene terephthalate) polyester textiles is that they have an extremely low moisture absorbency. Polyester fibers absorb about 0.6% water at 65% relative humidity whereas cotton and rayon absorb approximately 12% moisture. The end result is the textile materials do not "breathe"; i.e., moisture is not transmitted from the body to the atmosphere.

It is an object of this invention to provide a method for improving the disperse dyeability of a poly(ethylene terephthalate) ester resin adapted to be used for making fibers and films without significantly effecting the spinnability of the resin. Another object of the invention is to provide a fiber or film forming copolyester resin having improved disperse dyeability and improved moisture absorbency which has spinning characteristics similar to those of a poly(ethylene terephthalate)ester resin. A more specific object of the invention is to provide a fiber or film forming copolyester resin containing ethyleneterephthalate and hydantoin moieties which has improved disperse dyeability and good spinning characteristics.

The foregoing objects and others are accomplished in accordance with this invention, generally speaking, by providing a random copolyester prepared by the simultaneous esterification with ethylene glycol of a phthalic acid or a lower alkyl phthalate and a comonomer of the formula

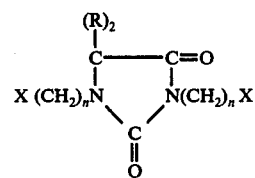

wherein R is a lower alkyl, aryl, aralkyl, alkylaryl or heterocyclic group which may be the same or different, X is —OH, —COOH or —COOR$_1$, R$_1$ is a lower alkyl, $n$ is an integer of 1 to 6, when X is —COOH or —COOR$_1$ and $n$ is 2 to 6 when X is —OH. It has been found that the disperse dyeability of a fiber of film forming poly(ethylene)terephthalate based polyester resin can be improved by adding one of the hydantoins or mixtures thereof during an esterification or transesterification of terephthalic acid, isophthalic acid or lower alkyl ester thereof with ethylene glycol to prepare a fiber forming polyester without significantly adversely affecting the spinning characteristics of the polyester resin. The comonomer disrupts the molecular structure of the polyester and thereby increases the ability of the polyester to absorb disperse dyes. The copolyester also has better moisture absorbency characteristics than a poly(ethylene terephthalate) polyester.

The preferred hydantoins are 1,3-bis(methyl n-propionate)-5,5-dimethylhydantoin and 1,3-bis(2-hydroxyethyl)-5,5-dimethyl hydantoin but the invention contemplates as a comonomer any other hydantoin of the above general formula such as, for example, 1,3-bis(4-hydroxybutyl)-5,5-diethylhydantoin, 1,3-bis(2-hydroxyethyl)-5,5-diphenylhydantoin, 1,3-bis(2-hydroxyethyl)-5,5 cyclohexyl hydantoin, 1,3-bis(butyl n-propionate)-5,5-dimethyl hydantoin and the like.

The fibers provided by the invention may contain from about 2 to about 15 mol percent units derived from the hydantoin comonomer. Preferably, the fibers contain from about 4 to about 8 mol percent units derived from the hydantoin comonomer.

The process provided by this invention for increasing the disperse dyeability and improved moisture absorbency of poly(ethylene terephthalate)ester based resins has the advantage over the process disclosed in U.S. Pat. No. 3,937,755 of requiring only one esterification step instead of the three required to prepare a block copolyester. The random copolyester provided by the invention is also advantageous over the block copolyester disclosed in the patent. The random copolyester surprisingly has a disperse dyeability at least equal to that of the block copolyester and, moreover, has improved spinnability. In other words, it can be spun into fibers more easily and by more diverse methods than the block copolyester. It has been found that the block copolyester can not be spun by conventional technics with a Chemtex Experimental Spinning and Drawing Machine available commercially from Chemtex Inc. Briefly, this machine is a batch type melt spinning machine having a hydraulic system, three zone heating jacket with temperature controls, finish applicator, feed and draw rolls, and take-up mechanism.

In the following illustrative examples of the invention, all parts and percentages are by weight unless otherwise specified.

EXAMPLE I

About 276 grams of dimethylterephthalate (DMT), about 37 g 1,3-bis(methyl n-propionate)-5,5-dimethylhydantoin (MPDH), about 216 g of ethylene glycol and 0.149 g of manganous benzoate were heated for 70 minutes in a nitrogen atmosphere, the temperature rising to 220° C., with evolution of methanol. A distillate of 124 ml was obtained. No elemental nitrogen was detected in the distillate.

A poly condensation catalyst, antimony tributylate [213 μl (0.05 mol %)] trimethyl phosphate [2-5 μl (50 ppm)], an ester interchange catalyst complexing agent, were added and the pressure then reduced to 0.1 mm of mercury. The temperature was increased to 280° C. After 75 minutes a copolyester containing 8 mol % MPDH was obtained having an intrinsic viscosity of 0.52 and a melting point of 239° C.

The copolyester was spun and drawn as 30/6 fiber on a Chemtex Experimental Spinning and Drawing Machine. The resulting yarn was knit into tubes.

EXAMPLE II

Example I was repeated except that about 294 grams of dimethylterephthalate, about 18.5 grams of 1,3-bis(-methyl n-propionate)-5,5 dimethylhydantoin (MPDH) and 216 g ethylene glycol were used to prepare a copolyester containing abut 4 mol % MPDH.

EXAMPLE III AND IV

Examples I and II were repeated except that homopolymers were prepared by replacing the MPDH with an equivalent amount of DMT in each of Examples III and IV.

EXAMPLE V

Example I was repeated except that the MPDH was replaced with sufficient dimethyl azelate to provide a copolyester containing 8 mol % dimethyl azelate units.

The tubes knit from the yarns of Examples I through V having the same weight and construction were dyed in the same dyebath at 100° C. with 1.0% by weight based on the weight of the tube of Eastman Polyester Blue GLF (Disperse Blue 27). Dyebaths which did not contain a carrier and dyebaths containing 5% by weight, based on the weight of the fabric, of Carolid 3F carrier were used. The depth of shade of the dyed tubes was then measured photometrically and compared as shown in Table I. The K/S value is determined from the equation $$\frac{K}{S} = \frac{\left[1 - \frac{R}{\infty}\right]^2}{2\frac{R}{\infty}}$$

wherein $R/\infty$ is the decimal equivalent of the Hunter L value; K is the absorption coefficient of the sample and S is the scattering coefficient of the sample. The larger the K/S value the darker the dyed sample.

In setting up the relationship K/S in Table I, the darkest sample (Example V) was assigned the value 1 and the values of Examples I-III are reported as fractions determined therefrom.

Table I

| Example No. | K/S without carrier | K/S with carrier |
|---|---|---|
| I | 0.31 | 0.46 |
| II | 0.66 | 0.74 |
| III | 0.22 | 0.36 |
| IV | 0.14 | 0.24 |
| V | 1 | 0.86 |

The difference between the colors of Example II and Example V dyed with the carrier was so slight that no difference was apparent to the eye. It will be noted from Table I from a comparison of Examples I and II with the homopolyester controls of Examples III and IV, that there was a significant improvement in the disperse dyeability of the copolyesters over the homopolyesters, particularly when a carrier was used.

EXAMPLE VI

About 300 grams of dimethylterephthalate (DMT), about 230.7 grams ethylene glycol, 26.8 grams of 1,3-bis(2-hydroxyethyl)-5,5-dimethylhydantoin and 0.03 mol percent, based on the DMT, of manganese benzoate were heated for about 70 minutes in a nitrogen atmosphere, the temperature rising to 220° C. with evolution of methanol.

When the ester interchange reaction was complete, about 80 parts per million trimethyl phosphate was added as a stabilizer to the prepolymer melt, and 0.05 mol %, based on the DMT, of antimony tributylate was added as a polycondensation catalyst. The pressure in the vessel was reduced to 0.1 mm of mercury and the temperature was increased to 280° C. After 75 minutes a copolyester containing 3.2 mol % units derived from 1,3-bis(2-hydroxyethyl)-5,5-dimethylhydantoin having an intrinsic viscosity of 0.63 and a melting point of 239° C. was obtained.

EXAMPLE VII

The copolyester described in Example VI was spun and drawn on a Chemtex spinning apparatus into 30/6 continuous filaments yarn. Knit fabric prepared from this yarn along with fabric of the same weight and construction prepared with a homopolyester were dyed in the same dyebath at 100° C. with 1.0% (owf) Duranol Blue G Grains-Disperse Blue 26 and 5% (owf) Carolid 3F carrier (a commercially available carrier composed primarily of biphenyl with at least 10 weight percent polyethylene glycol dispersing agent present). The depth of shade of the dyed fabrics was then measured photometrically yielding a color differential value of 9.73. The color differential is defined as the difference in photocell values between the experimental and normal polyester dyed samples. The greater this value, the greater is the depth of shade of the experimental sample compared to that of the normal polyester sample. AATCC IIIA washfastness test at 75° C. and lightfastness tests in the Carbon-Arc Fade-Ometer at 10, 20, 40 and 80 hours were performed on the experimental dyed sample and good to excellent ratings were obtained.

When fabric prepared from yarn in which 8 mol % dimethyl azelate was employed as a comonomer (see Example V) was dyed in the same dyebath with homopolyester as described above, a color differential of only 7.52 was obtained.

EXAMPLE VIII

About 276 grams of dimethylterephthalate (DMT), about 13.4 grams of dimethyl azelate, about 18.5 grams 1,3-bis(methyl n-propionate)-5,5-dimethyl hydantoin, about 230.7 grams of ethylene glycol and about 0.149 grams of manganous benzoate were heated for about 70 minutes in a nitrogen atmosphere, the temperature rising to 220° C. with evolution of methanol. When the ester interchange reaction was complete, about 0.268 grams of trimethylphosphate and about 0.238 grams of antimony tributylate were added. The pressure was reduced to 0.1 mm of mercury and the temperature was increased to 280° C. After 75 minutes a copolyester having an intrinsic viscosity of 0.55 and a melting point of 241° C. was obtained.

This copolyester was spun and drawn on a Chemtex spinning apparatus into 30/6 continuous filaments yarn. This yarn was knit into fabric without any difficulties and had dyeing characteristics about equal to those of the product of Example V.

Polyesters prepared from dimethylterephthalate, ethylene glycol and 1,3-bis(2-hydroxyethyl)-5,5-dimethylhydantoin according to the procedure outlined in Example VI show improved moisture absorption compared to polyethylene terephthalate polyesters and copolyesters modified with dimethyl azelate (DMAZ) as demonstrated in Table II.

TABLE II

Moisture Regain Properties of Polyesters Composed of Poly(ethylene)terephthlate, Poly(ethylene)terephthalate Modified with Dimethylazelate and Poly(ethylene)terephthalate Modified with 1,3-bis(2-hydroxyethyl)-5,5-dimethylhydatoin.

| Monomer Composition (mols) | | | | (wt. %) |
|---|---|---|---|---|
| DMT* | Ethylene Glycol | DMAZ** | EDH*** | Moisture Regain |
| 1.545 | 3.862 | — | — | 0.64 |
| 1.421 | 3.862 | 0.124 | — | 0.52 |
| 1.545 | 3.785 | — | 0.077 | 0.88 |
| 1.545 | 3.708 | — | 0.154 | 0.93 |
| 1.545 | 3.476 | — | 0.386 | 1.09 |
| 1.545 | 3.283 | — | 0.579 | 1.32 |

*DMT: Dimethyl terephthalate
**DMAZ: Dimethylazelate
***EDH: 1,3-bis (2-hydroxyethyl-5,5-dimethylhydantoin)

The moisture retention of the product of Example VIII was about equal to that of the DMT homopolyester of Table II and less than that of a DMT-hydantoin-ethylene glycol copolyester which does not include units derived from DMAZ. Hence, copolyesters consisting essentially of units obtained from a phthalic acid or ester thereof, a glycol and a hydantoin monomer are preferred to copolyesters which also contain units derived from DMAZ.

In order to demonstrate the improvement in spinning properties of the copolyester of the invention over the copolyester described in U.S. Pat. No. 3,937,755, copolyesters of the following examples were prepared.

EXAMPLE IX

In a reaction flask equipped with a heater, a column, a mechanical stirrer and a nitrogen inlet tube, were charged 136 grams of 1,3-bis(methyl n-propionate)-5,5-dimethylhydantoin, 113.5 grams of 1,3-bis(2-hydroxyethyl)-5,5-dimethylhydantoin, 0.05 milliliter of sulfuric acid of 30 percent solution in water and 0.25 gram of zinc acetate. The reactor was heated to 210° C. and the pressure was reduced to 0.3 millimeter of mercury pressure.

In three hours a polymer was formed. The product obtained had a molecular weight of 4514 and an intrinsic viscosity of 0.13.

EXAMPLE X 300 grams of polyethylene terephthalate having an intrinsic viscosity of 0.65 prepared by conventional ester interchange and condensation were blended with 37.5 grams of the polyester prepared in Example IX under vacuum. The mixture became clear, indicating that a reaction had taken place. The resulting copolymer had an intrinsic viscosity of 0.47 and could not be spun into a fiber in the Chemtex Experimental Spinning and Drawing Machine.

The random copolyesters provided by this invention contain the following units when the conomomer is a hydantoin alcohol:

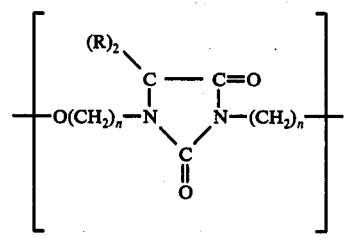

spaced along the chain randomly between two

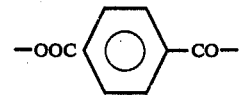

units. The comonomer is a hydantoin diacid or a hydantoin diester, the copolyester will contain the units:

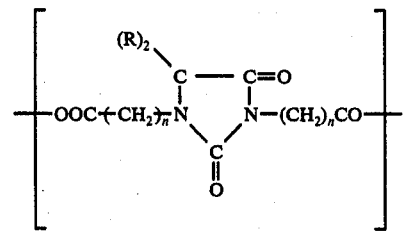

spaced in the chain randomly between two —OCH$_2$CH$_2$— groups. While it is not usually necessary to modify the composition of the copolyester, the chain thereof may include units derived from other monomers such as units derived from dimethyl azelate or the like, if desired.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. A disperse dyeable, water-absorbent polyethylene phthalate copolyester comprising units randomly spaced in its chain obtained by esterification of a phthalic acid or diester thereof and ethylene glycol with a hydantoin of the formula

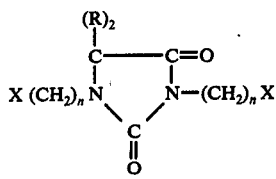

wherein R is hydrogen, lower alkyl, aryl, aralkyl, alkaryl or heterocyclic group which may be the same or different, X is —OH, —COOH or —COOR, $R_1$ is lower alkyl, n is an interger of 1 to 6 when X is —COOH or —COOR$_1$ and n is an integer of 2 to 6 when X is —OH.

2. The copolyester of claim 1 containing from about 2 to about 15 mol % of the hydantoin units based on the mols of the phthalic acid or diester.

3. The copolyester of claim 1 wherein the phthalic acid is terephthalic acid.

4. A fiber comprising the copolyester of claim 1 wherein the units in the chain are derived from dimethyl terephthalate, ethylene glycol and a hydantoin of the formula

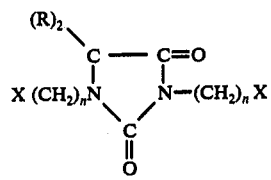

wherein R is hydrogen lower alkyl, aryl, aralkyl, alkaryl or heterocyclic group which may be the same or different, X is —OH, —COOH or —COOR$_1$, $R_1$ is lower alkyl, n is an integer of 1 to 6 when X is —COOH or —COOR$_1$ and n is a integer of 2 to 6 when X is —OH.

5. The fiber of claim 4 wherein the units of the chain are derived by esterification of dimethyl terephthalate, ethylene glycol and 1,3-bis(methyl n-propionate)-5,5-dimethylhydantoin or 1,3-bis(2-hydroxyethyl)-5,5-dimethyl hydantoin.

6. A method for improving the disperse dyeability of a polyethylene phthalate based polyester which comprises simultaneously esterifying a phthalic acid monomer or diester thereof, ethylene glycol and a monomeric hydantoin diacid, hydantoin diester of hydantion diol to form a copolyester containing in its chain randomly spaced units derived from the hydantoin.

7. The method of claim 6 wherein dimethyl terephthalate, ethylene glycol and 1,3-bis(methyl n-propionate)-5,5-dimethylhydantion or 1,3-bis(2-hydroxyethyl)-5,5-dimethyl hydantoin are esterified.

8. The method of claim 6 wherein from about 2 to about 15 mol % of the hydantoin units based on the mols of phthalic acid or diester are esterified with the other components.

9. The method of claim 6 wherein dimethyl terephthalate and ethylene glycol are esterified with a hydantoin of the formula

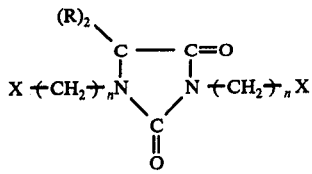

wherein R is a lower alkyl, aryl, aralkyl, alkaryl or heterocyclic group which may be the same or different, X is —OH, —COOH or —COOR$_1$, $R_1$ is lower alkyl, n is an integer of from 1 to 6 when X is —COOH or —COOR$_1$ and n is an integer of from 2 to 6 when X is —OH.

10. A one-step method for making a polyethylene phthalate copolyester having improved disperse dyeability over a homopolyester which comprises simultaneously esterifying a phthalic acid or diester thereof, ethylene glycol and a hydantoin diacid, hydantoin diester or hydantoin diol.

11. The method of claim 10 wherein dimethyl terephthalate and ethylene glycol are esterified with a hydantoin of the formula

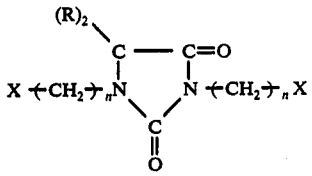

wherein R is a lower alkyl, aryl, aralkyl, alkaryl or heterocyclic group which may be the same or different, X is —OH, —COOH or —COOR$_1$, $R_1$ is lower alkyl and n is an integer of from 1 to 6 when X is —COOH or —COOR$_1$ and n is 2 to 6 when X is —OH.

12. The method of claim 10 wherein from about 2 to about 15 mol percent of the hydantoin based on the mols of phthalic acid or diester is esterified with the other components.

13. A spinnable copolyester having improved disperse dyeability and improved moisture retention comprising units obtained by removing the hydrogen atoms from the hydroxyl groups of a phthalic acid, units obtained by removing the hydrogen atoms from azelaic acid, units obtained by removing the hydroxyl group of a hydantoin alcohol or hydrogen atoms from a hydantoin diacid and units obtained by removing the hydroxyl groups from a glycol randomly joined together.

* * * * *

UNITED STATES PATENT OFFICE
CERTIFICATE OF CORRECTION

Patent No. 4,102,867     Dated July 25, 1978

Inventor(s) Harold R. Penton, Jr. and Kenneth B. Wagner

It is certified that error appears in the above-identified patent and that said Letters Patent are hereby corrected as shown below:

In Claim 1 at column 7, line 12 change "--COOR" to read -- —COOR --.

Signed and Sealed this

Twentieth Day of February 1979

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,102,867 Dated July 25, 1978

Inventor(s) Harold R. Penton, Jr. and Kenneth B. Wagner

It is certified that error appears in the above-identified patent and that said Letters Patent are hereby corrected as shown below:

Claim 1, at column 7, line 12 change "--COOR" to read -- —$COOR_1$ --.

This certificate supersedes Certificate of Correction issued February 20, 1979.

Signed and Sealed this

Twenty-second Day of May 1979

[SEAL]

Attest:

RUTH C. MASON
*Attesting Officer*

DONALD W. BANNER
*Commissioner of Patents and Trademarks*